UNITED STATES PATENT OFFICE.

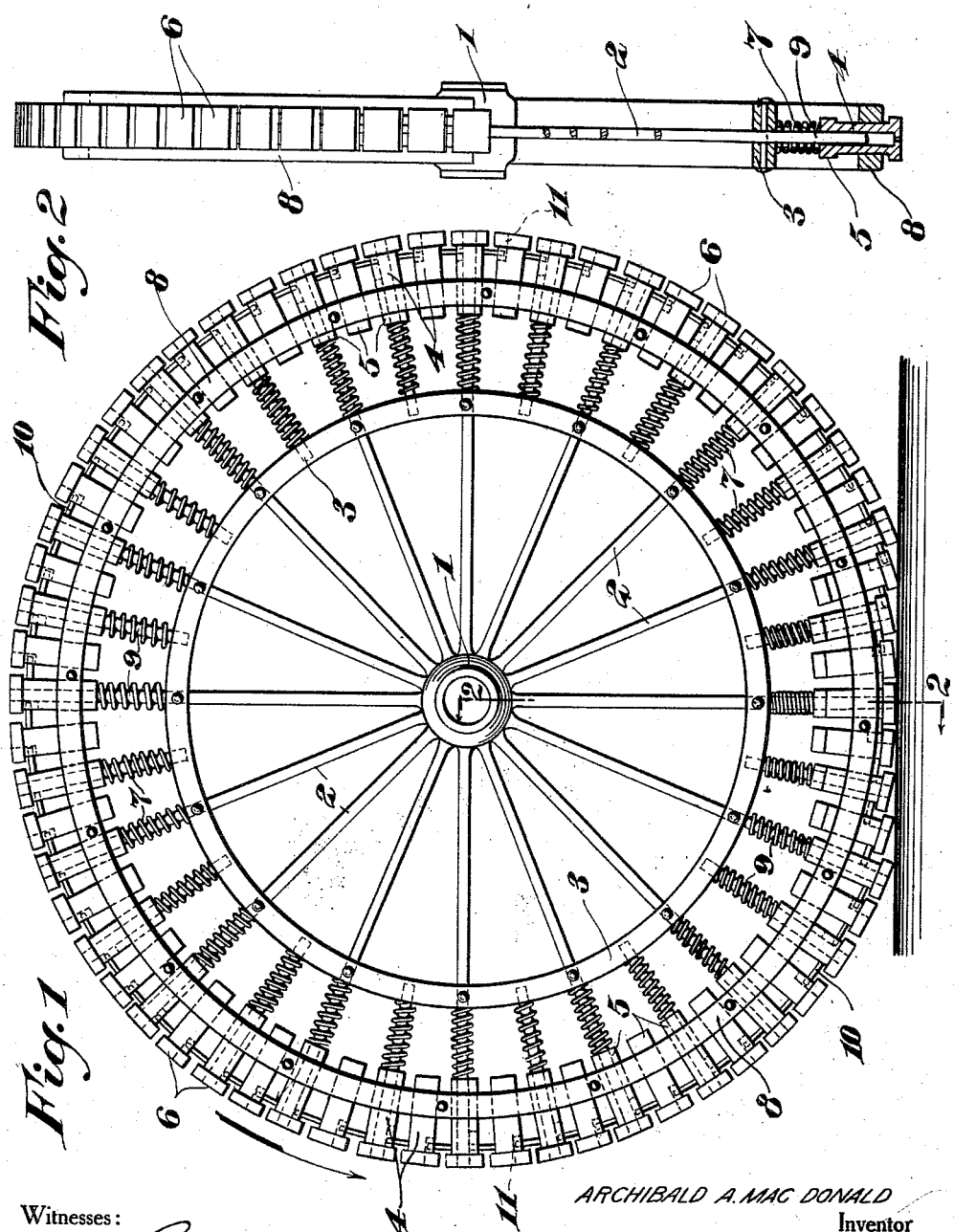

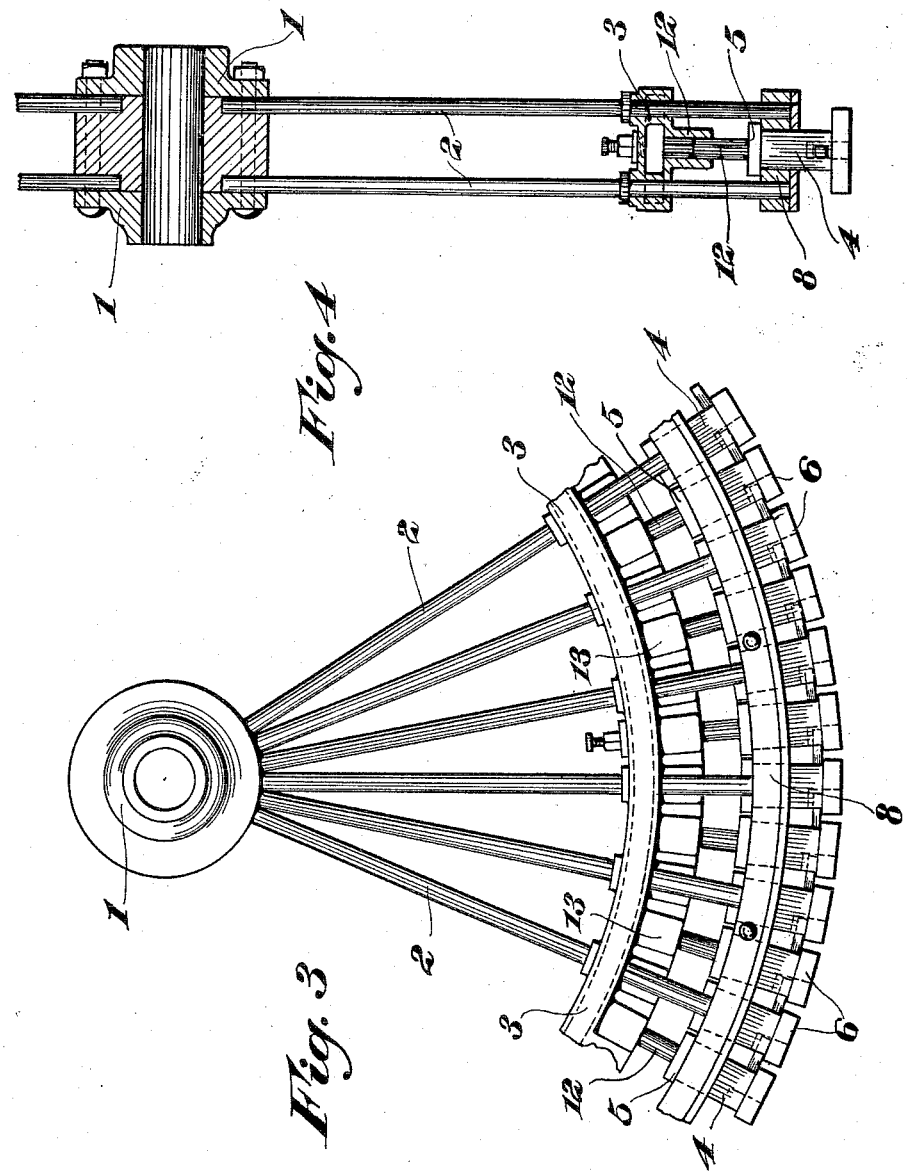

ARCHIBALD A. MacDONALD, OF NEW GLASGOW, NOVA SCOTIA, CANADA.

VEHICLE-WHEEL.

1,018,718.  Specification of Letters Patent.  Patented Feb. 27, 1912.

Application filed July 29, 1911. Serial No. 641,331.

*To all whom it may concern:*

Be it known that I, ARCHIBALD A. MAC-DONALD, a subject of the King of Great Britain, residing at New Glasgow, in the Province of Nova Scotia, Canada, have invented certain new and useful Improvements in Vehicle-Wheels; and I do hereby declare that the following is a full, clear, and exact description of the invention, such as will enable others skilled in the art to which it appertains to make and use the same.

The invention to be hereinafter described relates to cushion wheels.

In order to more clearly disclose the construction, operation, and use of the invention, reference should be had to the accompanying drawings forming part of the present application.

In the drawings: Figure 1 is a side elevation of the invention; Fig. 2 is an edge view of the same, partly in section on the line 2—2; Fig. 3 is a partial side elevation of a modified form; and Fig. 4 is a vertical cross section of Fig. 3.

Referring to the drawings in detail, and especially to Figs. 1 and 2, 1 indicates a hub from which extend a plurality of spokes 2 extending through and rigidly connected to an inner rim 3. The outer ends of these spokes are adapted to slidably receive tubular blocks 4 provided with inner and outer heads 5 and 6, the outer head 6 forming a tread surface. About each spoke 2 and between the inner rim 3 and the head 5, is disposed a coil spring 7 which acts, normally, to keep the block 4 in its outward position. On each side of the blocks 4 is slidably mounted one of two parallel outer rims 8. These rims are connected together in spaced relation by suitable bolts, pins, or the like. They are free to move toward and from the inner rim 3 as the blocks 4 are moved inwardly and outwardly. In addition to the spokes 2, short spokes 9 are provided. These spokes alternate with the regular spokes 2 and extend outwardly from the inner rim 3 and between the outer rims 8, in the same way. They also receive blocks 4 and are provided with springs 7 for forcing the blocks outwardly. Alternating with these spring pressed blocks are additional blocks 4. These blocks are identical in construction with the other blocks, or may be made solid instead of tubular, if desired.

The heads 6 of the blocks 4 are very close together and form practically a continuous sectional tread surface. From each of the blocks 4 extends a small flat plate 10 adapted to have limited sliding movement in a notch or recess 11. As the spring pressed blocks are forced inwardly by the weight on the wheel, their plates 10 will engage the bottom wall of the recesses 11 of the intervening blocks 4 and carry these blocks inwardly with them. As the spring pressed blocks are freed to the action of their springs, they will engage the plates 10 of the intervening blocks 4 and carry these plates outwardly with them. Thus, it will be seen that the heads 6 of the blocks 4 provide a substantially continuous sectional spring pressed tread surface.

A somewhat different form is shown in Figs. 3 and 4. In this form both the inner rim 3 and the outer rims 8 are made stationary. Also, the inner rim is made in the form of an annular air chamber to contain air under pressure, as a substitute for the springs of Figs. 1 and 2. The blocks 4 instead of being tubular are solid and are provided with stems or plunger ends 12 adapted to fit slidingly into tubular sockets 13 extending radially from the air chamber of the inner rim.

Instead of a single set of spokes, as in the form of Figs. 1 and 2, a double set of spokes is found more satisfactory in the form of Figs. 3 and 4.

It is thought that the operation and use of the invention will be clear from the preceding detailed description.

Changes may be made in the construction, arrangement, and disposition of the several parts of the invention without in any way departing from the field and scope of the same and it is meant to include all such within this application wherein only preferred forms have been disclosed.

Having thus fully described my invention, what I claim as new and desire to secure by Letters Patent is:

In combination with a wheel, an inner rim, outer rims, a plurality of tread blocks slidably mounted between said rims, cushioning means for supporting said blocks in their outward positions, and means connecting said blocks to permit limited sliding movement between successive blocks.

In witness whereof I have hereunto set my hand in the presence of two witnesses.

ARCHIBALD A. MacDONALD.

Witnesses:
LENA MATHESON,
RUBE McGREGOR.

Copies of this patent may be obtained for five cents each, by addressing the "Commissioner of Patents, Washington, D. C."